US006949183B2

(12) United States Patent
Etori

(10) Patent No.: US 6,949,183 B2
(45) Date of Patent: Sep. 27, 2005

(54) ELEMENT MANUFACTURING SYSTEM HAVING SUCTION JIG FOR ACCUMULATING FIBERS CONTAINED IN FIBER SOLUTION

(75) Inventor: Kenji Etori, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/875,944

(22) Filed: Jun. 24, 2004

(65) Prior Publication Data

US 2004/0262208 A1 Dec. 30, 2004

(30) Foreign Application Priority Data

Jun. 24, 2003 (JP) ....................................... 2003-180039

(51) Int. Cl.[7] ......................... B01D 29/64; B01D 29/66; D21J 7/00

(52) U.S. Cl. ....................... 210/167; 210/409; 210/413; 210/416.1; 162/218; 162/382

(58) Field of Search ................................ 210/167, 407, 210/409, 413, 416.1; 162/218, 382; 428/34.2

(56) References Cited

U.S. PATENT DOCUMENTS 4,272,318 A * 6/1981 Walker et al. .............. 162/382
5,575,913 A * 11/1996 Sharkey ...................... 210/409
5,755,963 A * 5/1998 Sugiura et al. .......... 210/493.1
5,759,351 A * 6/1998 Takahara et al. ............ 162/218
6,070,740 A * 6/2000 Sanami et al. .............. 210/457
6,878,275 B2 * 4/2005 Yamada ................... 210/416.4

FOREIGN PATENT DOCUMENTS

DE 3809864 * 10/1989

* cited by examiner

*Primary Examiner*—Fred G. Prince
(74) *Attorney, Agent, or Firm*—Harness, Dickey & Pierce, PLC

(57) ABSTRACT

A concentration adjustment unit adjusts a concentration of a fiber solution. An element forming unit includes an element forming tank, which receives the concentration-adjusted fiber solution, and a suction jig, which draws the concentration-adjusted fiber solution and accumulates fibers, which are contained in the drawn fiber solution, on a surface of the suction jig to form a filter element. A recovery unit includes a reservoir tank, which reserves recovered water that is drawn and is recovered through the suction jig. A filtration unit is provided in the recovery unit. The filtration unit includes a filter, which filters the recovered water, and jet nozzles, which remove the fibers, which are accumulated on a surface of the filter upon drawing and filtering the recovered water through the filter.

6 Claims, 3 Drawing Sheets

ELEMENT MANUFACTURING SYSTEM HAVING SUCTION JIG FOR ACCUMULATING FIBERS CONTAINED IN FIBER SOLUTION

CROSS REFERENCE TO RELATED APPLICATION

This application is based on and incorporates herein by reference Japanese Patent Application No. 2003-180039 filed on Jun. 24, 2003.

BACKGROUND OF THE INVENTION

1. Field of the Invention

The present invention relates to an element manufacturing system for manufacturing a filter element.

2. Description of Related Art

In a previously proposed element manufacturing method for manufacturing a filter element, such as an oil filter element or an air filter element, a suction jig is immersed in a fiber solution. The fiber solution contains fibers (e.g., pulp fibers, polyester fibers or the like) dispersed in water. A negative pressure is exerted in the suction jig, so that the fiber solution are drawn into the suction jig, and fibers contained in the drawn fiber solution are captured, i.e., are accumulated on a surface of the suction jig to form the filter element. FIG. 5 shows an exemplary element manufacturing system 1 for implementing the previously proposed element manufacturing method.

With reference to FIG. 5, the element manufacturing system 1 forms a closed system, in which water is circulated. Furthermore, the element manufacturing system 1 includes a concentration adjustment unit 10, an element forming unit 20, a recovery unit 30 and a filtration unit 40. In the concentration adjustment unit 10, a concentration of the fiber solution is adjusted. In the element forming unit 20, the fibers, which are contained in the concentration-adjusted fiber solution 13, are accumulated on the surface of the suction jig 23. In the recovery unit 30, recovered water 25, which has been drawn and has been recovered through the suction jig 23, is reserved in a reservoir tank 31. In the filtration unit 40, the recovered water 25 to be returned from the recovery unit 30 to the concentration adjustment unit 10 is filtered through a filter.

The recovered water 25 contains fibers, which have passed through the suction jig 23. Thus, these fibers contained in the recovered water 25 will be accumulated on a surface of the filter of the filtration unit 40. In order to provide stable supply of the recovered water 25 to the concentration adjustment unit 10 and to prevent overflow of the reservoir tank 31, frequent cleaning of the filter of the filtration unit 40 is required.

SUMMARY OF THE INVENTION

The present invention addresses the above disadvantage. Thus, it is an objective of the present invention to provide an element manufacturing system, which can reduce a frequency of cleaning of the filter or can eliminate the cleaning of the filter.

To achieve the objective of the present invention, there is provided an element manufacturing system that includes a concentration adjustment unit, an element forming unit, a recovery unit and a filtration unit. The concentration adjustment unit adjusts a concentration of a fiber solution. The fiber solution is prepared by dispersing fibers in water. The element forming unit includes an element forming tank and a suction jig. The element forming tank receives the concentration-adjusted fiber solution. The suction jig draws the concentration-adjusted fiber solution received in the element forming tank and accumulates the fibers, which are contained in the drawn fiber solution, on a surface of the suction jig to form a filter element on the surface of the suction jig. The recovery unit includes a reservoir tank, which reserves recovered water that is drawn and is recovered through the suction jig. The reservoir tank is connected to the concentration adjustment unit to supply the recovered water to the concentration adjustment unit. The filtration unit is provided in the recovery unit. The filtration unit includes a filter and a removing means. The filter filters at least a portion of the recovered water, which is reserved in the reservoir tank and is drawn through the filter. The removing means is for automatically removing at least a portion of the fibers, which are contained in the recovered water and which are accumulated on a surface of the filter upon drawing and filtering of at least the portion of the recovered water through the filter.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

(First Embodiment)

An element manufacturing system 1 according to a first embodiment of the present invention will be described with reference to FIG. 1. The element manufacturing system 1 is for manufacturing a filter element, which filters impurities or the like contained in a fluid. The element manufacturing system 1 forms a closed system, in which water is circulated through various units. The filter element, which is manufactured by the element manufacturing system 1, is used as, for example, an oil filter or an air filter.

Figure 1:
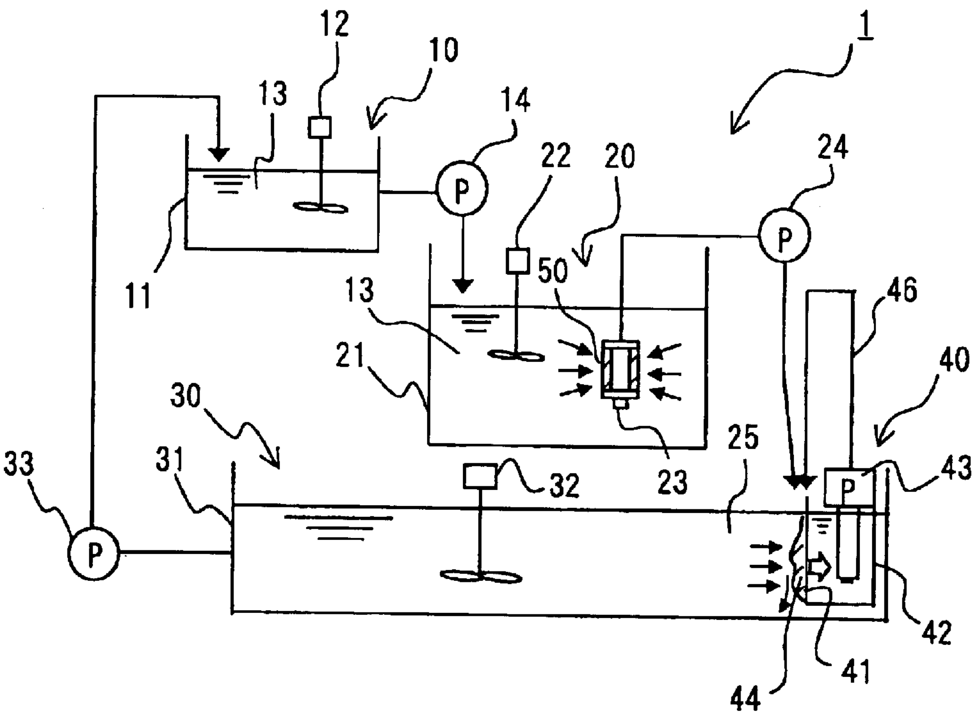
FIG. 1 is a block diagram schematically showing a structure of an element manufacturing system according to a first embodiment of the present invention.

With reference to FIG. 1, the element manufacturing system 1 includes a concentration adjustment unit 10, an element forming unit 20, a recovery unit 30 and a filtration unit 40, which cooperate together to form a closed system for circulating the water. The concentration adjustment unit 10 is for adjusting a concentration of a fiber solution. The element forming unit 20 is for forming the filter element using a suction jig. The recovery unit 30 is for reserving recovered water, which is drawn and is recovered through the suction jig. The filtration unit 40 is for filtering the recovered water, which is reserved in the recovery unit 30.

More specifically, the concentration adjustment unit 10 includes a concentration adjustment tank 11 and a stirrer 12. In the concentration adjustment tank 11, the fibers (natural fibers, such as pulp fibers, or chemical fibers, such as acryl fibers) are dispersed in water at a predetermined mixing ratio and are uniformly stirred by the stirrer 12 to form a slurry fiber solution 13 that has a predetermined concentration. The concentration-adjusted fiber solution 13 is then pumped by a feed pump 14 from the concentration adjustment unit 10 to the element forming unit 20.

The element forming unit 20 includes an element forming tank 21 and a stirrer 22. The concentration-adjusted fiber solution 13, which is supplied to the element forming tank 21, is stirred by the stirrer 22. A suction jig 23, which is used to form the filter element therearound, is immersed in the fiber solution 13 in the element forming tank 21.

The suction jig 23 has an outer shape, which corresponds to a shape of the filter element to be formed. Furthermore, a plurality of suction holes (not shown) is formed in a surface of the suction jig 23. An interior space of the suction jig 23, which is communicated with the suction holes, is connected to a suction pump 24 through a connection pipe line. Thus, when the suction pump 24 is operated, a negative pressure is exerted in the suction jig 23. As a result, the fiber solution 13 are drawn into the suction jig 23 by the negative pressure, and thereby the fibers contained in the drawn fiber solution 13 are captured, i.e., are accumulated on the surface of the suction jig 23 to form the filter element around the suction jig 23. In FIG. 1, the numeral 50 indicates the filter element in the middle of this filter element forming process performed in the element forming unit 20. The water, which is contained in the fiber solution 13, is drawn into the interior space of the suction jig 23 through the suction holes and is then pumped as recovered water 25 to the recovery unit 30 through the connection pipe line. An inner diameter of each suction hole is set to be smaller than lengths of the majority of the fibers, which are contained in the fiber solution 13, so that most of the fibers, which are contained in the fiber solution 13, are accumulated on the surface of the suction jig 23. However, some of the fibers, such as fibers which have relatively small lengths, pass through the suction holes of the suction jig 13 and thus are contained in the recovered water 25.

The filter element, which is formed on the surface of the suction jig 23, is removed together with the suction jig 23 from the element forming tank 21. Then, the filter element undergoes a dehydration/dry process for removing water and then undergoes a hardening process, in which binder resin is impregnated into the filter element to harden the filter element.

The recovery unit 30 includes a reservoir tank 31 and a stirrer 32. The reservoir tank 31 reserves the recovered water 25. The stirrer 32 stirrers the recovered water 25, which is reserved in the reservoir tank 31. The recovered water 25, which is uniformly stirred in the reservoir tank 31, is drawn from the reservoir tank 31 and is then fed to the concentration adjustment unit 10 by a recovery pump 33. In the present embodiment, the water is circulated in the manufacturing system 1, so that addition of a substantial amount of water is not required at the concentration adjustment unit 10 after providing an initial amount of water at the beginning of the manufacturing process. The fibers, which have passed through the suction jig 23, are also returned to the concentration adjustment unit 10 for recycling. Thus, the manufacturing system 1 is environmentally advantageous.

When the element manufacturing conditions are kept constant, a generally constant amount of fibers pass through the suction jig 23. Thus, when a concentration of the recovered water 25 in the reservoir tank 31 is measured in advance at the time of, for example, manufacturing a prototype filter element or at a beginning of mass production of the filter element or when the amount of the fibers used in the formation of the filter element (i.e., the amount of the fibers consumed in the element manufacturing system 1) is measured, the required amount of the fibers to be supplied to the concentration adjustment unit 10 as a material of the fiber solution 13 can be computed. Therefore, the recovered water 25, which contains the fibers and is reserved in the reservoir tank 31, can be directly supplied to the concentration adjustment unit 10 to adjust the concentration of the fiber solution 13.

However, most of the fibers, which have passed through the suction holes of the suction jig 23, are short fibers, which have a fiber length shorter than that of the fibers, which are accumulated on the surface of the suction jig 23. When a large amount of recovered water 25 contained in the reservoir tank 31 is supplied to the concentration adjustment tank 11 at once, the fiber solution 13, which contains a large amount of short fibers, is temporarily produced. Such a fiber solution 13 may have a substantial influence on a fiber density of the filter element formed in the element forming unit 20. More specifically, a filter performance may substantially vary from one manufactured filter element to the other manufactured filter element. Thus, when the recovered water 25, which contains the fibers, is supplied to the concentration adjustment unit 10 to adjust the concentration of the fiber solution 13, it is desirable that a relatively small amount of recovered water 25 is continuously supplied to the concentration adjustment tank 11 of the concentration adjustment unit 10 without causing a substantial influence on the fiber density of the filter element formed in the element forming unit 20. For example, the amount of fibers contained in the recovered water 25 to be supplied to the concentration adjustment unit 10 can be adjusted to constitute about 5 weight percent of the fibers newly supplied to the concentration adjustment unit 10.

Next, the filtration unit 40, which is a characteristic part of the present embodiment, will be described. The filtration unit 40 is provided in the recovery unit 30 and at least partially immersed in the recovered water 25 in the reservoir tank 31. The filtration unit 40 includes a filter 41, which filters the recovered water 25 and is provided in an immersed part of the filtration unit 40 that is immersed in the recovered water 25 in the reservoir tank 31. In the present embodiment, as shown in FIG. 1, the filtration unit 40 further includes a box shaped base 42, which has an opening located above the water surface of the recovered water 25. The filter 41 is provided at one side of the base 42. The filtration unit 40 also includes a filtration pump 43, which is provided in the base 42 and draws the recovered water 25 through the filter 41 to filter the recovered water 25 through the filter 41. In a non-operating state of the filtration pump 43, only a filtrate (i.e., water without the fibers) of the recovered water 25 is contained in the base 41. Upon operation of the filtration pump 43, a portion of the recovered water 25 contained in the reservoir tank 31 is drawn and is filtered through the filter 41.

Figure 2:
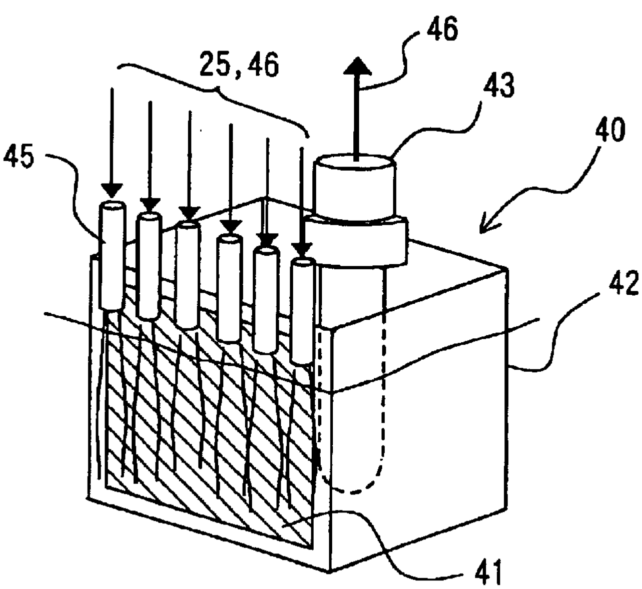
FIG. 2 is an enlarged view of a filtration unit of the element manufacturing system.

At this time, as shown in FIG. 1, fibers 44, which are contained in the recovered water 25, are accumulated on a surface of the filter 41. In the present embodiment, as shown in FIG. 2, the filtration unit 40 includes a plurality of jet nozzles 45, each of which is positioned at a top side of the filter 41 and outputs a water jet toward the surface of the filter 41. The jet nozzles 45 serve as a removing means for removing the fibers 44 accumulated on the surface of the filter 41. The recovered water 25, which is pumped from the element forming unit 20 to the recovery unit 30, and filtrated water 46, which is the filtrate of the recovered water 25 filtered through the filtration unit 40, can be used as the water of the water jet, which is outputted from each jet nozzle 45. It should be understood that the fibers 44, which are accumulated on the surface of the filter 41, are eliminated in FIG. 2 for the sake of simplicity.

As discussed above, the element manufacturing system 1 of the present embodiment includes the filtration unit 40, which performs self cleaning of the filter 41 by the jet nozzles 45. Thus, the frequency of cleaning of the filter 41 can be reduced, or the cleaning of the filter 41 can be eliminated. That is, manufacturing of the filter element can be continued for a relatively long period of time without cleaning.

The provision of the filtration unit 40 in the reservoir tank 31 of the recovery unit 30 allows elimination of an accommodating space for accommodating the filtration unit 40 between the recover unit 30 and the concentration adjustment unit 10. Furthermore, the recovered water 25 and the filtrated water 46, which have been used to clean the surface of the filter 41, can be directly recovered into the reservoir tank 31. Thus, the manufacturing system 1 can be simplified.

The recovered water 25 and the filtrated water 46, which are outputted from the jet nozzles 45, do not need to be applied to the filter 41 in a manner that completely prevents accumulation of the fibers 44 on the surface of the filter 41. Rather, it is only required to apply the recovered water 25 and the filtrated water 46 in a manner that at least limits clogging of the filter 41 by the fibers 44.

In the present embodiment, as shown in FIG. 1, both the recovered water 25 and filtrated water 46 are outputted from the jet nozzles 45. However, only one of the recovered water 25 and the filtrated water 46 can be outputted from the jet nozzles 45 as the water jets.

In the present embodiment, the filtration unit 40, which is provided in the recovery unit 30, is used to filter the recovered water 25 in the reservoir tank 31 to provide the filtrated water 46, which does not substantially contain the fibers. When fibers are left on the surface of the suction jig 23 after removal of the formed filter element from the suction jig 23 at outside of the element forming tank 21, the left fibers could cause formation of a defective filter element. In the previously proposed element manufacturing system, in order to prevent the formation of the defective filter element, cleaning water, which does not contain fibers, needs to be separately provided, and the suction jig 23 needs to be cleaned with the cleaning water at the outside of the element forming tank 21 every time the filter element is formed. However, in the element manufacturing system 1 of the present invention, it is not required to separately provide the cleaning water, and the suction jig 23 can be cleaned with the filtrated water 46, which is circulated in the manufacturing system 1. Therefore, the element manufacturing system 1 of the present invention is economically advantageous. Furthermore, the filtrated water 46, which contains the fibers after cleaning the suction jig 23, can be recovered into the reservoir tank 31 of the recovery unit 30. Thus, the manufacturing system 1 is environmentally advantageous.

(Second Embodiment)

A second embodiment of the present invention will be described with reference to FIG. 3.

Most of components of the element manufacturing system 1 of the second embodiment are the same as those of the element manufacturing system 1 of the first embodiment. Thus, the same components will not be described, and only different components, which are different from those of the first embodiment will be mainly described.

The second embodiment differs from the first embodiment in the following point. That is, in the second embodiment, the filtrated water 46 is used as the recovered water 25, which is supplied from the recovery unit 30 to the concentration adjustment unit 10.

Figure 3:
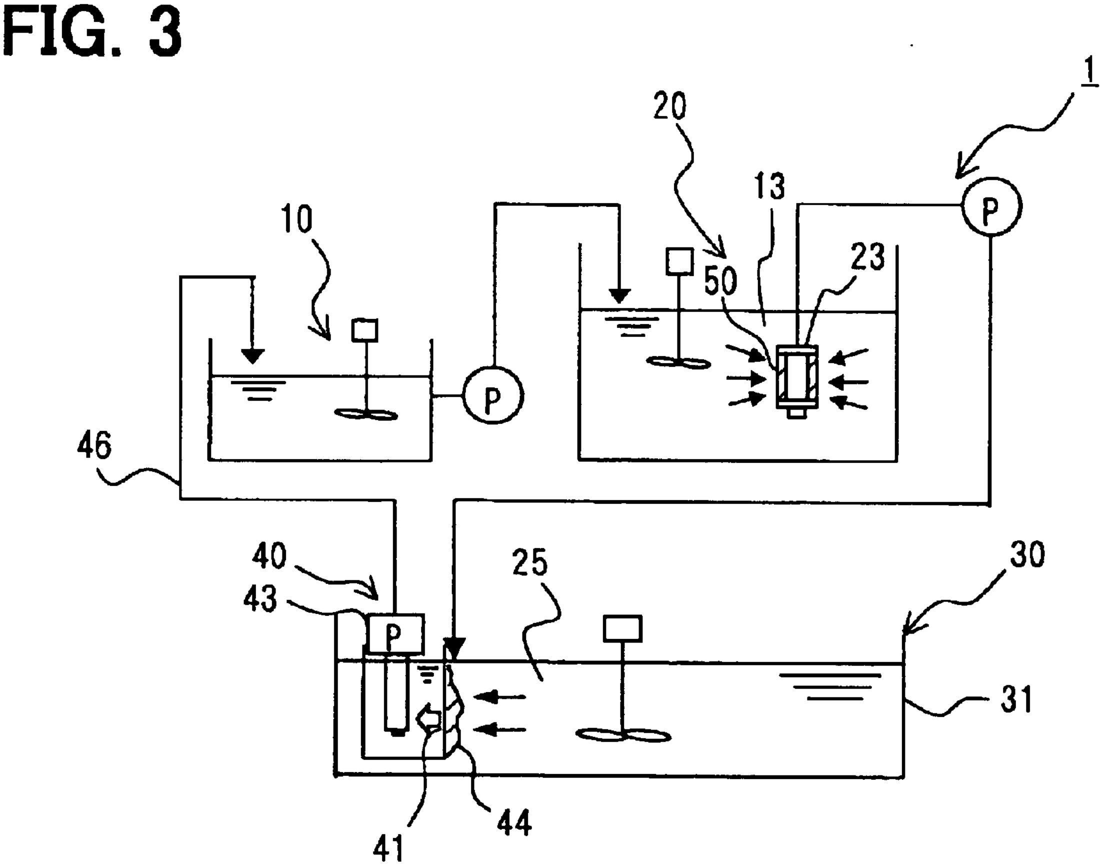
FIG. 3 is a block diagram schematically showing a structure of an element manufacturing system according to a second embodiment of the present invention.

As shown in FIG. 3, the filtration unit 40 is arranged in the reservoir tank 31 of the recovery unit 30. When the filtration pump 43 is operated, the recovered water 25 in the reservoir tank 31 is drawn and is filtered through the filter 41.

In the present embodiment, the recovered water 25 in the reservoir tank 31 is not directly supplied to the concentration adjustment unit 10. Rather, the filtrated water 46, which is the filtrate of the recovered water 25 that is drawn and is filtered through the filtration unit 40, is supplied from the recovery unit 30 to the concentration adjustment unit 10. Thus, the water, which is returned to the concentration adjustment unit 10, is the filtrated water 46, which does not substantially contain the fibers. As a result, the concentration of the fiber solution 13, which is adjusted in the concentration adjustment unit 10, is stabilized. Also, the filter element quality is stabilized.

Similar to the first embodiment, the fibers 44, which are accumulated on the surface of the filter 41, are removed by water jet using the recovered water 25, which is pumped from the element forming unit 20. Besides the recovered water 25, the flow of the filtrated water 46, which is supplied to the concentration adjustment unit 10, can be branched and can be used as the water source of the water jet for removing the fibers 44 from the filter 41. Furthermore, the branched flow of the filtrated water 46 can be used for cleaning the suction jig 23.

The above embodiments can be modified as follows.

Figure 4:
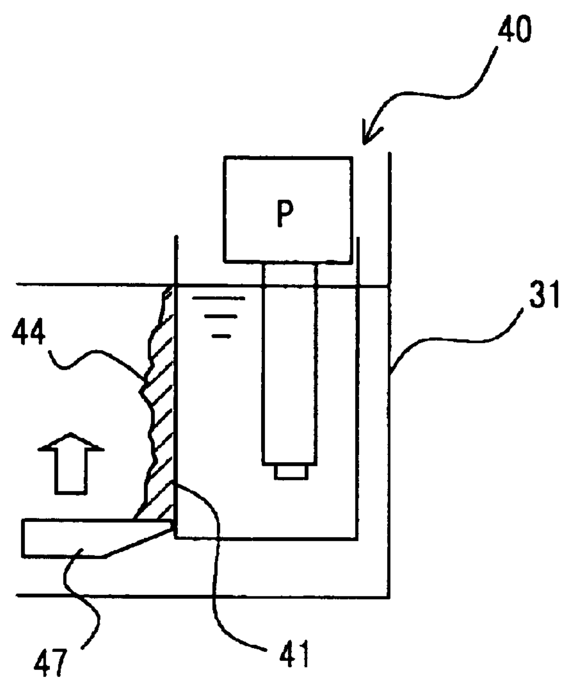
FIG. 4 is an enlarged view showing a modification of the filtration unit of the element manufacturing system of the first or second embodiment.
Figure 5:
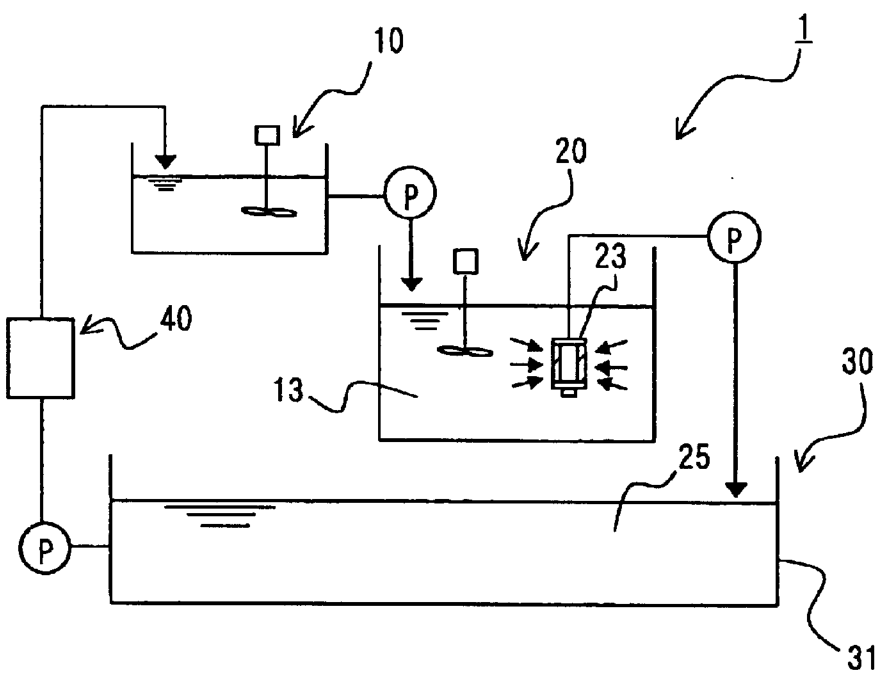
FIG. 5 is a block diagram schematically showing a structure of a previously proposed element manufacturing system.

In the above embodiments, the jet nozzles 45 are used as the removing means for removing the fibers 44 accumulated on the surface of the filter 41 of the filtration unit 40. However, the removing means is not limited to the jet nozzles 45. For example, with reference to FIG. 4, in place of the jet nozzles 45, the filtration unit 40 can have a scraper 47 as the removing means. The scraper 47 automatically scrapes off the fibers 44, which are accumulated on the surface of the filter 41. When the scraper 47 moves upwardly from a tank 31 lower surface side of the filter 41 along the surface of the filter 41, the fibers 44 can be removed. At this time, a distal end of the scraper 47 can be in contact with the surface of the filter 41 to completely scrape off the fibers 44. Alternatively, the scraper 47 can be spaced a predetermined distance from the surface of the filter 41 to scrape only a portion of the fibers 44. The scraped fibers 44 can be added little by little to the fibers, which are used as the material of the fiber solution 13 added in the concentration adjustment unit 10, to recycle the scraped fibers 44. Furthermore, the scraper 47 can be moved to scrape off the fibers 44 from the surface of the filter 41.

In the second embodiment, the filtrated water 46, which is filtered in the filtration unit 40, is supplied as the recovered water 25 from the recovery unit 30 to the concentration adjustment unit 10. In this case, the concentration of the recovered water 25 in the reservoir tank 31 of the recovery unit 30 gradually increases. However, the scraper 47 is provided in the filtration unit 40 as the removing means, and the fibers 44, which are accumulated on the surface of the filter 41, are scraped off by the scraper 47. In this way, the fibers 44 can be recycled, and an increase in the concentration of the recovered water 25 in the reservoir tank 31 can be limited.

Additional advantages and modifications will readily occur to those skilled in the art. The invention in its broader terms is therefore not limited to the specific details, representative apparatus, and illustrative examples shown and described.

What is claimed is:

1. An element manufacturing system comprising:

a concentration adjustment unit that adjusts a concentration of a fiber solution, wherein the fiber solution is prepared by dispersing fibers in water;

an element forming unit that includes:

an element forming tank that receives the concentration-adjusted fiber solution; and a suction jig that draws the concentration-adjusted fiber solution received in the element forming tank and accumulates the fibers, which are contained in the drawn fiber solution, on a surface of the suction jig to form a filter element on the surface of the suction jig;

a recovery unit that includes a reservoir tank, which reserves recovered water that is drawn and is recovered through the suction jig, wherein the reservoir tank is connected to the concentration adjustment unit to supply the recovered water to the concentration adjustment unit; and a filtration unit that is provided in the recovery unit, wherein the filtration unit includes:

a filter that filters at least a portion of the recovered water, which is reserved in the reservoir tank and is drawn through the filter; and a removing means for automatically removing at least a portion of the fibers, which are contained in the recovered water and which are accumulated on a surface of the filter upon drawing and filtering of at least the portion of the recovered water through the filter.

2. The element manufacturing system according to claim 1, wherein:

the removing means of the filtration unit includes at least one nozzle; and the at least one nozzle outputs a water jet of at least one of:

the recovered water, which is drawn through the suction jig; and filtrated water, which is a filtrate of the recovered water that is drawn and is filtered through the filter.

3. The element manufacturing system according to claim 1, wherein the removing means of the filtration unit includes a scraper that removes at least the portion of the fibers, which are accumulated on the surface of the filter.

4. The element manufacturing system according to claim 3, wherein the scraped fibers, which are scraped by the scraper, are supplied to the concentration adjustment unit.

5. The element manufacturing system according to claim 1, wherein the recovered water, which is supplied from the recovery unit to the concentration adjustment unit, passes through the filter before being supplied to the concentration adjustment unit, so that filtrated water, which is a filtrate of the recovered water that is drawn and is filtered through the filter, is supplied to the concentration adjustment unit as the recovered water.

6. The element manufacturing system according to claim 1, wherein:

the suction jig is cleaned by filtrated water, which is a filtrate of the recovered water that is drawn and is filtered through the filter, after removal of the filter element upon formation of the filter element; and the filtrated water, which has been used for cleaning the suction jig, is recovered into the reservoir tank of the recovery unit.

* * * * *